(12) United States Patent
Brown et al.

(10) Patent No.: US 9,342,049 B2
(45) Date of Patent: May 17, 2016

(54) MULTI-SPECTRAL HOLOGRAPHIC SECURITY MARKER, METHOD FOR ITS MANUFACTURE AND HOLOGRAPHIC SECURITY SYSTEM

(75) Inventors: Stephen Christopher Brown, Leicester (GB); Steven L. Smith, Hartsdale, NY (US); Martin John Richardson, Leicester (GB)

(73) Assignee: De Montfort University, Leicester (GB)

( * ) Notice: Subject to any disclaimer, the term of this patent is extended or adjusted under 35 U.S.C. 154(b) by 496 days.

(21) Appl. No.: 13/820,270

(22) PCT Filed: Sep. 3, 2010

(86) PCT No.: PCT/GB2010/001662
§ 371 (c)(1),
(2), (4) Date: May 2, 2013

(87) PCT Pub. No.: WO2012/028835
PCT Pub. Date: Mar. 8, 2012

(65) Prior Publication Data
US 2013/0229697 A1   Sep. 5, 2013

(51) Int. Cl.
*G03H 1/00* (2006.01)
*G03H 1/22* (2006.01)
(Continued)

(52) U.S. Cl.
CPC .............. *G03H 1/0011* (2013.01); *B42D 25/29* (2014.10); *B42D 25/328* (2014.10); *G03H 1/18* (2013.01);
(Continued)

(58) Field of Classification Search
CPC . G03H 1/0011; G03H 1/0248; G03H 1/2286; G03H 1/0005; G03H 1/2202; G03H 1/0402; G03H 2222/34; G03H 1/02; G03H 1/0236; G03H 1/04; G03H 2001/2615; G03H 1/028; G03H 2210/52; B42D 25/328; B42D 25/00; B42D 25/29

USPC ............................ 359/2, 3, 10, 15, 22, 28, 32
See application file for complete search history.

(56) References Cited

U.S. PATENT DOCUMENTS

| | | | |
|---|---|---|---|
| 5,319,476 A | 6/1994 | Yamazaki et al. | |
| 5,856,048 A | 1/1999 | Tahara et al. | |

(Continued)

FOREIGN PATENT DOCUMENTS

| | | | |
|---|---|---|---|
| GB | 2 433 129 A | 6/2007 | |
| GB | 2 456 596 A | 7/2009 | |

(Continued)

OTHER PUBLICATIONS

International Search Report for PCT/GB2010/001662, dated Jun. 7, 2011 (3 pages).

*Primary Examiner* — Jade R Chwasz
(74) *Attorney, Agent, or Firm* — Kilyk & Bowersox, P.L.L.C.

(57) ABSTRACT

A multi-spectral holographic security marker is made by a novel method according to the invention involving a replay frequency shift to one or more final replay frequencies of a part or parts only of a recorded image plane volume hologram. The marker comprises an optional surface hologram and an image plane volume hologram. The volume hologram is divided into discrete areas which have mutually different final replay frequencies. The security information carried by the marker is a combination of the size and shape of those different replay areas together with the hologram content itself which is spread across the different replay areas. If the marker also includes a surface hologram, then that is preferably aligned with the junctions between the replay areas. Preferably one volume hologram replay frequency is in the visible spectrum and the other is in the invisible part of the spectrum (IR or UV).

18 Claims, 2 Drawing Sheets

(51) Int. Cl.
  *G03H 1/26*   (2006.01)
  *G03H 1/18*   (2006.01)
  *B42D 25/29*  (2014.01)
  *B42D 25/328* (2014.01)
  *G03H 1/02*      (2006.01)
  *G03H 1/04*      (2006.01)

(52) U.S. Cl.
  CPC ............ *G03H 1/182* (2013.01); *G03H 1/2202* (2013.01); *G03H 1/028* (2013.01); *G03H 1/0236* (2013.01); *G03H 1/0244* (2013.01); *G03H 1/0248* (2013.01); *G03H 1/0406* (2013.01); *G03H 2001/0016* (2013.01); *G03H 2001/0264* (2013.01); *G03H 2001/0296* (2013.01); *G03H 2001/186* (2013.01); *G03H 2001/187* (2013.01); *G03H 2001/2244* (2013.01); *G03H 2001/2289* (2013.01); *G03H 2001/266* (2013.01); *G03H 2001/2635* (2013.01); *G03H 2210/53* (2013.01); *G03H 2222/15* (2013.01); *G03H 2222/16* (2013.01); *G03H 2260/12* (2013.01); *G03H 2260/16* (2013.01); *G03H 2260/34* (2013.01)

(56) References Cited

U.S. PATENT DOCUMENTS

| | | |
|---|---|---|
| 5,920,058 A | 7/1999 | Weber et al. |
| 2007/0285746 A1 | 12/2007 | Millington et al. |
| 2007/0297211 A1 | 12/2007 | Ehreke et al. |

FOREIGN PATENT DOCUMENTS

| | | |
|---|---|---|
| JP | 6-43799 A | 7/1992 |
| JP | 10-97170 A | 4/1998 |
| WO | 2006021102 A1 | 3/2006 |
| WO | 2008045625 A2 | 4/2008 |

MULTI-SPECTRAL HOLOGRAPHIC SECURITY MARKER, METHOD FOR ITS MANUFACTURE AND HOLOGRAPHIC SECURITY SYSTEM

FIELD OF THE INVENTION

The invention relates to the field of holographic security marking, and provides a multi-spectral holographic security marker and system that creates a wide range of potentially valuable novel security marking opportunities, all with considerably enhanced security.

BACKGROUND ART

Holographic security markers are currently incorporated into a wide range of products which have high intrinsic value or which contain personal or commercially sensitive information. Credit cards and many passports include holographic panels, as do many currency notes. Typically those holographic panels are surface holograms, otherwise known as relief holograms or holographic optical elements (HOEs) embossed into a surface of a portion, typically a metal foil portion, of the product which needs to be certified as genuine. Such HOEs are formed by the formation of a surface diffraction grating on the foil. Typically the surface diffraction grating is embossed by pressing onto the foil a master 'negative' formed from a material harder than the metal of the foil. The press used is similar to a printing press.

It is known that volume holograms can include far more readable data than surface holograms or HOEs. Their use is however limited because the higher cost of creating volume holographic images currently outweighs the advantages. Volume holograms have been proposed which replay in the visible range. Volume holograms have also been proposed which replay in the invisible range, such as the infrared (IR) range. Such an image is only properly displayed when interrogated with an appropriate beam which matches the recording beam in frequency and incidence angle, although it is known how to move the replay frequency to another frequency, typically by swelling or contracting the substrate in which the hologram is recorded. WO-A-2008/045625 discloses the creation of a holographic security panel of a high value article such as a mobile telephone in which two volume holographic images are recorded in the same portion of the telephone casing. One image is in the visible range of the spectrum and the other is in the invisible portion of the spectrum. The volume holograms disclosed in WO-A-2008/045625 are however transmission holograms which when replayed generate an image in space above or remote from the recorded holographic film.

Even if two volume holographic images are recorded in the same security panel as proposed above, they must be recorded separately, and the accuracy of the register of the two holographic images is therefore just as good as the accuracy of the set-up of the initial recordings. In many security markers, including those used to verify the genuine nature of bank notes, one valuable aspect of the security guarantee is the accuracy of alignment of two or more elements of the printed or holographic security markings. This invention seeks to provide a security marker and system in which a far higher degree of security is established by the accurate alignment of portions of a recorded volume hologram which have mutually different replay frequencies, optionally together with an equally accurate alignment of those portion with elements of a surface relief hologram (HOE) recording.

THE INVENTION

The invention provides a multi-spectral holographic security marker as defined in claim 1 herein. The marker incorporates a single volume hologram with at least two final replay frequencies which preferably include frequencies in both the visible and invisible portions of the spectrum (for example both the visible and the IR range or both the visible and the UV range). The invention also provides a method of making such a holographic security marker as defined in claim 7 herein and a security system as defined in claim 14 herein.

The holographic data in a volume hologram is contained in structures called "Bragg planes". Bragg's law and the Bragg condition are of importance for such holograms:

$$2d \sin \theta = \lambda_a / n$$

where $\theta$ is half the angle between the reference and the object beams at the recording stage (as well as the angle between the illuminating and the diffracted beams and the scattering planes in the emulsion at reconstruction), d is the spacing between the interference planes in the emulsion, $\lambda_a$ is the wavelength in air, and n the average refractive index of the hologram medium.

The invention also preferably combines HOEs or surface holograms and the above multi-spectral image plane volume holograms in a unique manner. Preferably the surface hologram of a security marker according to the invention comprises a visually recognisable security image visible by the human eye without additional specialist hologram display and recognition equipment. Such a hologram is commonly used in credit cards, passports, bank notes and packaging at present. If in a security marker according to the invention such a surface hologram were applied directly over the portions of the image plane volume hologram capable of replay in the invisible part of the spectrum and between portions of the image plane volume hologram capable of replay in the visible part of the spectrum, then on visual inspection one would see two aligned images. The image of the volume hologram would typically be viewable over a larger viewing angle than the surface hologram image and would be less sensitive to viewing angle. As the viewing angle changes, the surface hologram image will tend to vary in colour or flicker, whereas the volume hologram image would be a more constant display. The result would be a very useful first order check on the genuine nature of the security marker. Misalignment of the surface and volume holographic images would immediately suggest a forgery. By visual inspection the user can therefore immediately verify that the hologram displayed is typical of that expected for the item being examined. Surface holograms of the Benton type display the effect of a rainbow whereas a volume hologram is seen as a single frequency replay. Therefore if there were no variation in the appearance of the image then that would provide an immediate visual indication to the user that the article being examined was not genuine. The aligned surface hologram and at least that portion of the volume hologram beneath replayable in the visible portion of the spectrum are preferably graphical in nature, for ease of recognition.

A far greater amount of data can however be contained in a volume hologram than in a surface hologram. One use of a security marker according to the invention could be for each volume hologram to include a digital code such as a bar code or a matrix code containing security data. Bar codes are sometimes referred to as unidimensional codes because they are essentially linear in data content. There are currently 28 different standards or symbologies, and typically bar codes would be read by a scanning laser. Two-dimensional or matrix codes are also known, and can contain far greater amounts of information or data. There are currently 39 different accepted standards for matrix codes, of which QR codes ("Quick Recognition" codes) are but one example. Matrix codes cannot be read by lasers as there is no established sweep pattern that can encompass the entire symbol. They are read by camera capture devices which are responsive to the complete two-dimensional matrix of each coded symbol.

If the image plane volume hologram is recorded in the infrared ("IR") range and has an initial replay frequency in the IR range; and if parts of that image have been shifted to a visible final replay frequency, then the entire image can only be seen when it is illuminated by both of (i) an IR beam of the appropriate frequency and viewed at the appropriate angle and (ii) a visible beam of the appropriate frequency and viewed at the appropriate angle. Therefore the holographic security system of the invention preferably includes a security marker volume hologram which is an image plane holographic recording of security information, different parts of which are capable of final display at different wavelengths; means for illuminating the volume hologram with light of those different wavelengths; and a camera or data capture device able to identify and fuse together the different wavelength displays to recreate the complete security information. The camera or data capture equipment can itself include a coded holographic key, so that if the volume hologram includes elements of a validation code or message (optionally distributed through the portions of the volume hologram replayable at different final replay frequencies and possibly through the surface hologram as well) that code or message is readable only when matched with other elements of the same validation code or message included in the holographic key or phase mask in the camera or data capture equipment. A simple validation code could be a word such as "GENUINE" or "VALID", individual letters of which or even individual pixels of which are distributed between the different portions of the volume hologram replaying at different frequencies and optionally also between the surface hologram and/or the coded holographic key in the camera or data capture equipment. The validation code would then only be readable using the camera or data capture equipment tuned to the actual frequencies of the different portions of the volume hologram. Consider also the situation in which the first volume hologram is a matrix code such as a QR code. Such codes can contain massive amounts of data, readable by a camera. To take advantage of the multi-spectral properties of the recorded hologram in which different parts of the hologram replay at different frequencies, that camera preferably reads in both the visible and an invisible frequency range, and the image plane volume hologram contains portions readable in both ranges. If that data is encrypted, then it can be sent to a computer for decryption only if a validation code or message is read and recognized, that code or message being composed of data in the hologram and data in the camera filter or mask assembled or fused together to create the complete authorisation code or message recognized by the controlling software.

Volume Hologram Recording

Image plane volume holograms can be recorded on thin or thick film data carriers that are sensitive to exposure to light to a resolution that enables the creation of information-carrying interference patterns. For example, the film data carrier may be a silver halide film having distributed therein nano-sized particles of photosensitive material. First, the film is exposed to create the information-carrying interference pattern. After exposure the information-carrying interference pattern is developed by techniques not dissimilar to known photographic development techniques, and after development the recorded interference pattern is fixed in the data carrier by removing from the film all nano-particles of the original unexposed photosensitive material. As a generality, the initial replay frequency or frequencies of the recorded hologram (identified herein as the one or more first replay frequencies) is the same as the frequency or frequencies of the laser which created the initial interference patterns within the film data carrier.

Photopolymers for Image Plane Volume Hologram Recording

The photopolymer volume hologram recording material used to record the image plane volume holograms according to the invention consists of three parts: a photopolymerizable monomer, an initiator system (which initiates polymerization upon exposure to light) and a polymer (the binder). A method to record an image plane volume hologram comprises first exposing the recording material to the information-carrying interference pattern. This exposure polymerizes a part of the monomer. Monomer concentration gradients, formed by variation in the amount of polymerization due to the variation in exposures, give rise to diffusion of monomer molecules from the regions of high concentration to the regions of lower concentration.

The process is simple and very suitable for machine processing. Generally the holograms are reproduced by contact copying from masters (full beam copying or scanning by a laser beam). The sensitivity of the polymer material restricts the copying speed. The polymer material is more expensive than the materials currently used for creating surface or relief holograms, which is a reason why volume holograms are not generally used for security documents. Despite that known cost deterrent, however, proposals do exist for making use of the higher security features available from volume holograms. For example, WO2006/021102 discloses a possible combination of a volume hologram with a printed motif or even with a surface hologram to create a combined image, visible to the human eye, which indicates whether the item marked (which could be a bank note, a credit card or an identity card for example) is a valid item or not.

Volume holographic data carriers have recently been developed which are both pressure-sensitive and light-sensitive. They are polymers which, if they have a volume hologram recorded on them, can vary the display colour or frequency of that hologram, dependent on the external pressure applied to the polymer. Currently the readily available pressure-sensitive and light-sensitive polymers are also cross-linkable. The replay frequency of the recorded hologram is fixed by the subsequent cross-linking process. Cross-linking is usually achieved by ultraviolet irradiation. Therefore if the volume hologram is recorded on a film of such a polymer before cross-linking, the colour of any display of that hologram can be varied and fixed by varying the external pressure applied during or immediately prior to the ultraviolet radiation which results in cross-linking of the polymer. The variation of the colour of any display of the recorded hologram is a consequence of distortion of the Bragg planes of the data carrier material, which distortion is fixed when the polymeric material is cross-linked. Thus cross-linking fixes the final replay frequency, and therefore the colour (i.e. the wavelength), of the recorded hologram.

The recording of an image plane volume hologram in the above polymers is rather simple. The polymer film is generally laminated to a piece of clean glass or attached to a glass plate (or to some other pressure-resistant substrate) using an index-matching liquid. Holograms can be recorded manually, but in order to produce large quantities of holograms, a special machine is required. For hologram replication a laser line scanning technique can provide the highest production rate. The photopolymer material typically needs an exposure of about 10 mJ/cm$^2$.

The creation of the optional surface hologram is initially carried out according to known procedures. A hard metal die is created, having embossed into its surface a surface diffraction pattern which is a negative of the diffraction pattern necessary to display the holographic recording. Such dies are conventionally used for the mass production of holographic security images on credit cards and bank notes, when they are pressed onto the surface of a foil element of the item being marked, to create a positive impression which is the holographic diffraction grating. According to the invention, however, the die is made with two (or more) distinct thickness portions, preferably arranged in a recognisable pattern. For example, the die plate may have a basic constant thickness with an array of constant height studs extending from one face, to align together in another plane or in more than one other plane. The surface hologram negative is recorded only on the said one face, between the studs. The stud faces in that other plane or planes have not been recorded with the holographic negative. When the die is used to press the surface hologram into the top face of the photopolymer film which has the volume hologram recorded therein, or into a surface coating over that top face, the surface hologram is formed on the photopolymer film only on its top surface, and the array of studs causes compression of the photopolymer film between the surface hologram recorded areas. Thus the volume hologram recorded in the photopolymer film is converted into two or more portions of the same holographic image, replayable at different final replay frequencies. The volume hologram portions recorded immediately below the surface hologram are either maintained at the original recorded replay frequency or moved to a minor extent to a higher final replay frequency, and the volume hologram portions recorded below the studs are moved to a greater extent to a higher final replay frequency, caused by the greater compression of the photopolymer film beneath the studs. If the studs are of heights terminating in two or more planes, then the portions of the volume hologram compressed by the studs of one height are moved to a different final replay frequency than the portions compressed by studs of a different height.

A converse of the above geometry is possible. The surface hologram negative may be recorded only on the top surface of some or all of the studs of the die, so that in the final security marker the portion of the volume hologram below the surface hologram has been moved to a higher final replay frequency than the portion of the volume hologram below the area or areas not carrying the surface hologram diffraction pattern.

The surface hologram impression die to be used in the recording of a security marker using the former geometry may for example be prepared by first creating a conventional negative die of uniform thickness and having the surface hologram negative impression over the whole of its surface, then coating a second layer of photoresist of a predetermined thickness on top of the surface hologram. Then an optical mask is utilised to image a pattern on top of the photoresist layer, causing alternating areas of hardness when exposed to UV illumination. This is then etched to remove the unexposed photoresist thereby revealing the surface relief hologram below. This new pattern master will be silvered and electroformed to create a new stamping die that now contains areas of smooth, thicker areas ("studs") and lower areas that have surface relief holograms to be used as a master die or stamper, achieving a precise depth to define the areas between the surface hologram impressions in the final security marker film where the recorded volume hologram is shifted to a different final replay frequency than the areas directly beneath the recorded surface hologram.

DRAWINGS

Figure 1:
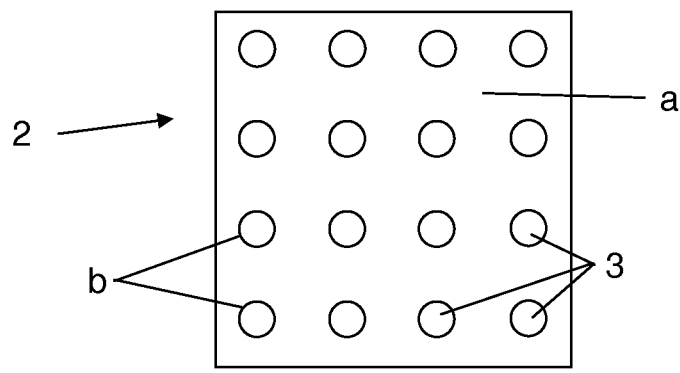
FIG. 1 is a schematic view of a security marker according to the invention.

FIG. 1 is a simple illustration of a security marker according to the invention. Typically it comprises an image plane volume hologram of a specific image or pattern recorded at one frequency, for example visible green or invisible IR light. It has parts of its image shifted to a higher final replay frequency, such as green to UV light which is invisible in the sense that it is no longer visible to the naked eye, or IR to visible light. An optional surface hologram formed as a surface relief pattern hologram over the invisible replay frequency parts of the volume hologram adds an alternating (channel) image to the remaining viewable image. The invisible pattern is only discernible using suitable detection equipment and is needed to complete the security validation of the holographic elements of the security marker when the multispectral (hyperspectral) nature of the complete security marker is analyzed.

The marker of FIG. 1 consists of a holographic film data carrier 2 which has a general surface a of one height and circular depressions b of a lesser height. The portions b represent least one area of the display surface of the holographic film which has been compressed in a press, and the general surface a represents the remainder of the display surface. Of course, there may be other areas in addition, created by compressing portions of the film data carrier to different extents. As illustrated, the portions b are discrete circles and the portion a is a continuous surface between and around those circular depressions b. It will be understood however that any combination of different shapes and areas can be contemplated, and indeed the user can derive much information concerning the genuine nature of the security marker by close examination of the number, shape and distribution of the areas a and b in which the recorded holographic image displays in different spectral bandwidths. They may display as differently coloured image portions or with one portion being in the visible part of the spectrum and the other being invisible to the human eye.

For example, the area a may lie directly over the part of an image plane volume hologram that has been recorded in the IR range in the film data carrier 2 and which is replayable in the IR (invisible) part of the spectrum. In contrast, the areas b lie directly over and in fact define parts of the image plane volume hologram which have been compressed so as to distort the Bragg planes of the original recorded image plane volume hologram and move the final replay frequency into the visible range.

As an optional security feature, the area a has impressed thereon a surface hologram. Visually, the security marker of FIG. 1 can be inspected by the naked eye, and it will appear as a conventional surface hologram, for example a picture of an animal, symbol or other logo which appears to move when viewed at different angles. The pattern of areas b however is of relatively constant intensity and does not 'flicker' as the viewing angle changes. The security marker therefore has a distinctive appearance as a first indication of authenticity. The register between the two images (surface hologram and image plane volume hologram) is such that together they can be seen as complementary parts of the same image. The volume hologram does however contain much more potential data than does the surface hologram, so a further security check can be by a closer visual inspection of the holographic display of the area a.

Not all of the recorded image plane volume hologram can however be seen through the areas b. Some has been recorded under the area a, but that portion of the holographic recording has not had its final replay frequency shifted to the visible part of the spectrum, and maintains a final replay frequency in the IR range. That part of the image can be inspected by illuminating the marker with IR light of the appropriate frequency and viewing the displayed image using an IR camera. Indeed, the apparatus for validating and reading data from the recorded hologram preferably comprises means for illuminating the security marker with both visible and invisible light of suitable wavelengths, and a dual frequency camera capable of image recognition in the visible and invisible ranges. To the uninformed observer such a camera detects only that which is visible, but in reality it can read the visible portion of the volume hologram beneath areas b together with the invisible portion beneath the area a. It can possibly also read the surface hologram image from surface a. Each of those images contains a different element of information contributing to the final merged or fused composite image which is detectable only by the camera. If the camera itself incorporates a coded holographic phase mask, then data from all three (or potentially more) holograms together with data in the mask code is needed before the image can be validated.

Figure 2:
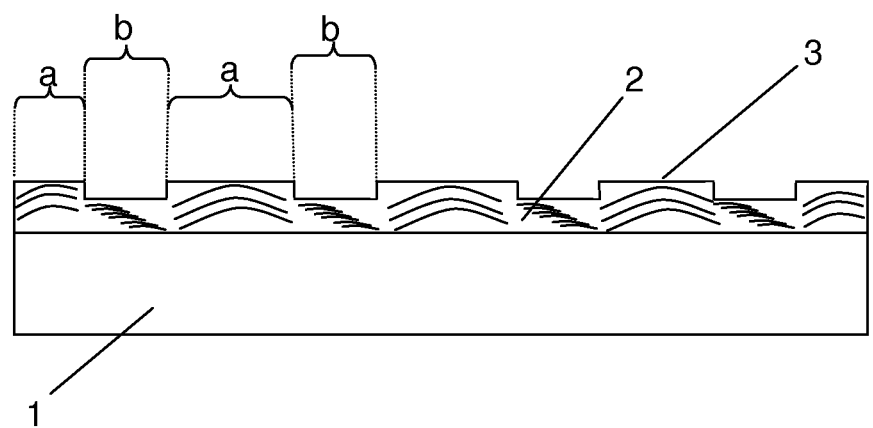
FIG. 2 is a vertical section through the holographic security marker according to FIG. 1.

FIG. 2 shows at a very general and schematic level the construction of the security marker according to FIG. 1. It comprises a support substrate 1 to which is adhered a holographic film data carrier 2. A volume hologram containing security data is recorded at a first frequency in the film 2. A surface hologram 3 is recorded on the portions of the film data carrier marked a in FIG. 1, with the areas marked b being devoid of any recorded surface hologram material. The area directly beneath the surface hologram recorded zone a is a portion of an image plane volume hologram capable of replay when irradiated by light of a first interrogation wavelength, for example IR light, and the area b beneath every portion that is not recorded with a surface hologram is another portion of the same volume hologram but is capable of replay only when irradiated by an interrogating beam of light having a different wavelength, for example light in the visible range. The two final replay frequency areas are respectively depicted in FIG. 1 by mutually different sets of curved lines, those lines being intended to represent the Bragg planes within the holographic film, which are distorted in the areas b so that they no longer have the same characteristics as the original recorded Bragg planes beneath the areas a. Even though the film data carrier 2 may have been initially recorded with a single volume hologram, by distorting the Bragg planes in only one of the two areas a and b, or by distorting the Bragg planes in the two areas to different extents, there is provided according to the invention a multi-spectral security marker incorporating composite holographic information, in which the portions of the recorded volume hologram replayable at one final replay frequency is aligned precisely beneath the portions a of the security marker carrying the surface hologram 3, and the portions of the recorded volume hologram replayable at the other final replay frequency is confined precisely to the areas b directly beneath portions of the film data carrier which have no surface hologram recorded thereon.

Figure 3:
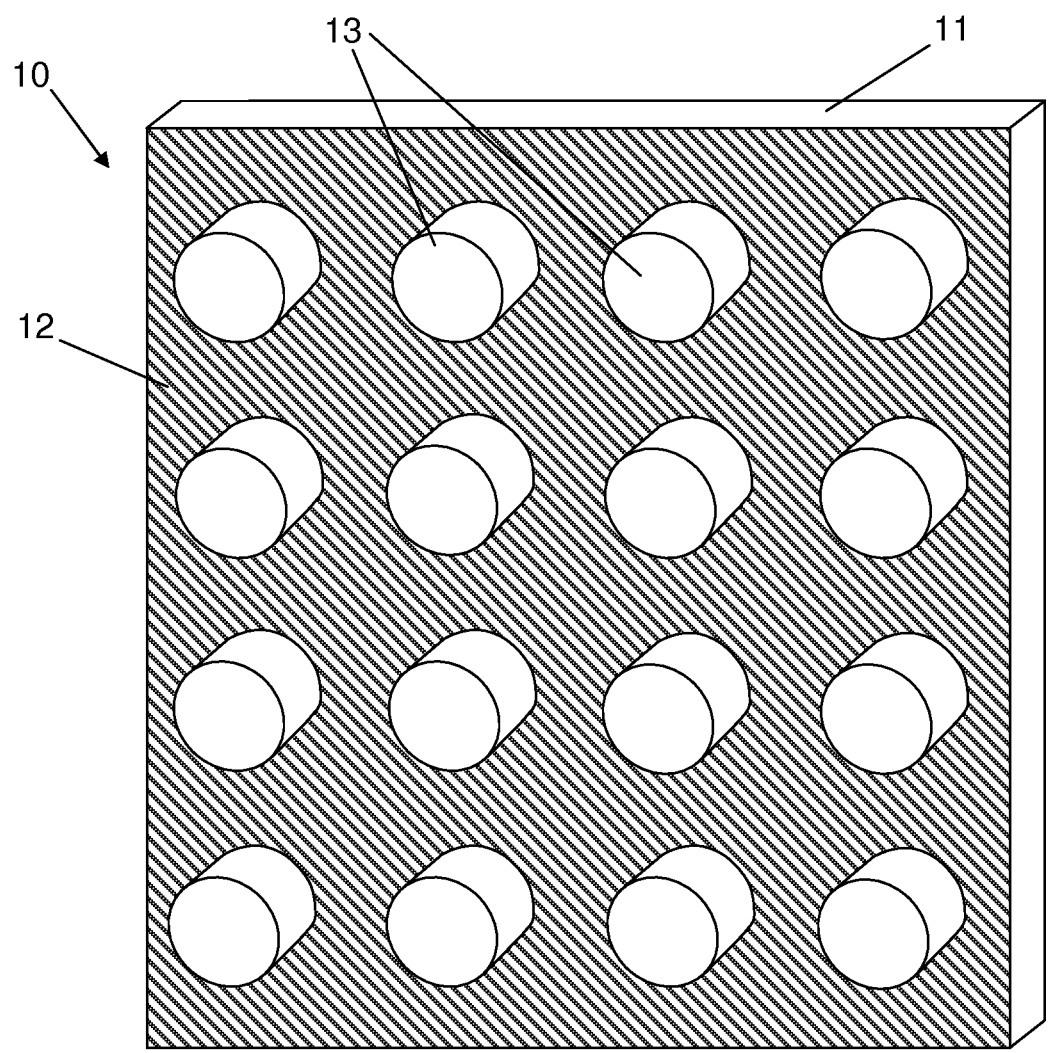
FIG. 3 is a perspective view of a die used to record the surface hologram on the security marker of FIG. 1.

FIG. 3 illustrates how the security marker of FIG. 1 is created. Initially the film data carrier 2 of FIG. 1 is of uniform thickness throughout, and is a polymeric pressure-sensitive and light-sensitive material that is capable of volume holographic storage. An image plane volume hologram is recorded in that film data carrier. That initial recording may be in the visible or in the invisible part of the spectrum. The invisible parts of the spectrum include the IR and UV frequency ranges. Initially the volume hologram is recorded over a specific and predefined area of the film data carrier, typically but not exclusively the whole of its area. The surface hologram may then be created either directly on the exposed upper surface of that film data carrier or on a surface coating applied thereto. If the surface hologram is applied to a surface coating, then that surface coating must be one that is partially transmissive. The surface hologram is transferred in a press using a holographic die which has embossed into the surface thereof a negative of the surface relief required to generate the necessary interference fringes in the top surface of the film data carrier 2 to create the surface hologram. A suitable die 10 is shown in FIG. 3. It has the same overall area as the predefined area of the film data carrier in which the volume hologram has been recorded. Most of the die 10 comprises a metal plate 11 of uniform thickness, but extending from one face of that plate 11 is an array of studs 13. Their thickness is somewhat exaggerated in FIG. 3 for ease of illustration. The plate surface 12 between adjacent studs has embossed thereon the negative of the surface hologram, as illustrated schematically by diagonal hatching. The end faces of the studs 13 have no such surface hologram embossed thereon.

The die 10 can be used in a press similar to that used for the current creation of surface holograms used as security markers in credit cards and bank notes, among other items. In credit card and bank note security markers, the die is pressed downwardly onto the surface of a foil strip. According to the invention, the die 10 may be pressed down either onto the actual upper surface of the film 2 in which the volume hologram is embedded, or onto a surface coating over the film 2. When the die 10 of FIG. 3 is pressed onto the surface of the holographic film 2 according to the invention, the final surface hologram or HOE is created as an embossed diffraction grating on the surface of the film 2 or of its coating only in the areas a shown in FIG. 1, being the area between the studs 13 of FIG. 3. The film area b beneath the studs 13 is compressed by a significantly greater amount. The compression in the areas a may or may not be sufficient to distort the Bragg planes and to move the recorded volume hologram beneath the areas a to a different final replay frequency. The film 2 beneath the areas b as defined by the studs 13 is compressed to a much greater amount, resulting in a significant distortion of the Bragg planes and a significant shift of the final reply frequency of the volume hologram recorded in the film 2 beneath the areas b. It will immediately be seen that the resulting volume holograms, replayable at mutually different interrogation frequencies, are directly and precisely aligned with the portions a of the final film 2 which carry the HOE. Immediately after the pressing of the die 10 onto the film carrier 2, the film carrier 2 may be cross-linked, if cross-linking is necessary to maintain the distortion of the Bragg planes. That cross-linking may be achieved by exposure of the film 2, immediately after the embossing process, to ultraviolet radiation.

The final replay frequency of individual areas of the volume hologram is a function of the initial recording wavelength. However, the degree of movement of the volume hologram replay frequency in the zones b is also a function of the initial thickness of the holographic film 2, the axial extent of the studs 13, and the pressure used during the step of imprinting the surface hologram or HOE in the areas a. None of those three variables is readily ascertainable by any method of reverse engineering according to which a forger might try to delaminate and inspect the security marker of FIG. 1. The creation of an identical security marker as a forged guarantee of authenticity of an article so marked is therefore virtually impossible. Other parameters which can affect the distortion of the Bragg planes during the impression step when the die 10 is pressed against the surface of the holographic film 2 are temperature and humidity, and those also are parameters that are easy for a genuine manufacturer to control, but impossible to ascertain even by destructive examination of the resulting marker.

The fusion of the shifted and the unshifted final playback frequencies of the volume hologram in a marker according to the invention achieves a degree of security vastly superior to anything that could have been achieved in known manufacturing techniques. Prior to this invention, the recordal of two volume holograms in a film data carrier, replayable at different final replay or excitation frequencies, has required two separate hologram recordal processes. That is expensive, and does not have the accuracy of the method of the present invention, which starts out with a single recorded volume hologram and then separates that into hologram portions with two mutually different final replay frequencies. Furthermore it has never before been possible to achieve the exact register between the surface and multiple frequency volume holograms that is achieved according to the invention.

The holographic security marker of the invention affords a number of discrete and independently verifiable levels of security. At first glance, the recorded HOE can be inspected visually. If that is not the device or symbol normally associated with the product to which the security marker is attached, then it can be assumed that the product is not genuine. A more detailed examination can detect whether the HOE and the volume hologram recorded in areas b are aligned accurately. For example the recorded holograms could incorporate a single line which continues from one hologram to the other without interruption, or could comprise cross hairs in one hologram which align with a target device in the other, either being a reasonable indication of security. Alternatively the letters or pixels of a word indicating the genuine nature of the article to which the security marker is attached could be divided between the HOE and the volume hologram recorded in area b, so that the complete word can easily be read, but only when the two holograms are in precise alignment, as they are according to the invention.

A still further level of security can be achieved in a system which includes a hologram as described above in conjunction with a light source for exposing the hologram recorded in the area a to a stimulating radiation outside of the visible range. If the recorded hologram is then replayed at that frequency outside of the visible range, then a special purpose camera or other equipment for reading the image can be used to recognise every element of the recorded hologram. By comparing the elements of the recorded hologram outside of the visible range with the corresponding elements recorded in the visible range, and in particular by comparing the mutual alignment of those two holographic images, a further guarantee of authenticity of the article marked with the security marker can be obtained. A final level of security can be obtained if a volume hologram recorded in the holographic film directly beneath the areas b in FIG. 1 contains some but not all of a security code or number, and the camera or other reading equipment includes a holographic phase mask for adding data to that security code or number. Then a block can be established, preventing any encrypted data read from the volume hologram from being sent to a decryption computer until such time as a complete authorisation code has been identified. For ultimate security, that authorisation code could be split between all three recorded holograms in the security marker according to the invention, and a holographic phase mask or key contained within the camera.

An alternative conformation (not illustrated) of the die 10 of FIG. 2 would be to have the negative of the holographic diffraction medium embossed on the otherwise planar ends of the studs 13 rather than on the surface between adjacent studs. The result would be that in FIG. 3 the areas a would display only the volume hologram in the frequency range of the original recording or a frequency close thereto (for example the IR range) and the areas b would contain the HOE directly over volume hologram recordings capable of replay at a different final replay frequency, for example a frequency in the visible range.

The invention claimed is:

1. A method of making a multi-spectral holographic security marker comprising:

recording, in a film data carrier of a multi-spectral holographic security maker, an image plane volume hologram having a first replay frequency, the hologram being a hologram of graphic data or a linear code or a matrix code containing security data, wherein the multi-spectral holographic security marker comprises an image plane volume hologram recorded to have the first replay frequency in a light-sensitive film data carrier, the film data carrier comprises a polymeric material that is pressure-sensitive so that on compression the final replay frequency of the recorded volume hologram is shifted away from the respective first replay frequency, the image plane volume hologram recorded in the film data carrier comprises graphical data or a linear code or a matrix code containing security data, and different areas of the film data carrier have been compressed after recordal of the volume hologram therein, with the result that a plurality of different areas of the film data carrier have a plurality of different final replay frequencies for the hologram recorded therein, with the different areas having boundaries which together form a security identification code or pattern which provides further security data, and a surface hologram is impressed, on the surface of the film carrier or on a surface coating thereon, over areas of the security marker in which the recorded volume hologram has the same replay frequency, with the boundary or boundaries of the surface hologram corresponding precisely with the boundary or boundaries of the said areas of the security marker in which the recorded volume hologram has the same replay frequency;

preparing a die one or more portions of which have a given thickness and one or more other portions of which have at least one thickness greater than the given thickness, the boundaries of the different thickness portions of the die together forming a security code or pattern; and pressing the die into the surface of the film data carrier or into a surface covering thereon, the pressure being sufficient to move the final replay frequencies of the portions of the volume hologram recorded directly beneath those portions of the die having the greater thickness or thicknesses to one or more final replay frequencies each different from the first replay frequency;

thereby creating in the film data carrier an image plane volume hologram of the graphic data or the linear code or matrix code security data, of which at least one area has the first replay frequency and at least one other area has a final replay frequency differing from the first, with the different areas having boundaries which together form the said security identification code or pattern which provides further security data, wherein the die is a holographic master die, with either the one or more portions thereof with the given thickness or the one or more portions thereof with the thickness greater than the given thickness having a surface carrying the negative of a surface diffraction grating embodying a surface hologram, so that when the master die is pressed into the surface of the film data carrier or into the surface coating thereon, the pressure is sufficient to create, in the said one or more portions of the surface or surface coating, a surface hologram which is directly above and in alignment with an area or areas of the recorded volume hologram which have a single replay frequency.

2. The method according to claim 1, wherein the different areas of the film data carrier which have been compressed after recordal of the volume hologram therein include mutually different areas which have been compressed to mutually different extents, with the result that the mutually different areas have mutually different final replay frequencies for the hologram recorded therein, each of the mutually different final replay frequencies being different from the first replay frequency.

3. The method according to claim 1, wherein at least one of the final replay frequencies is in the visible spectrum and at least one is in the invisible spectrum.

4. The method according to claim 1, wherein the surface hologram is impressed over areas of the security marker in which the recorded volume hologram has a final replay frequency in the invisible part of the spectrum.

5. The method according to claim 4, wherein the surface hologram is impressed over areas of the security marker in which the recorded volume hologram has a final replay frequency in the IR part of the spectrum.

6. The method according to claim 1, wherein the surface hologram is impressed over areas of the security marker in which the recorded volume hologram has a final replay frequency in the visible part of the spectrum.

7. A method according to claim 1, wherein the first replay frequency of the volume hologram is in the infrared range and the final replay frequencies of the volume hologram in the plurality of other areas are in the visible range.

8. A method according to claim 1, wherein the first replay frequency of the volume hologram is in the visible range and the final replay frequencies of the volume hologram in the plurality of other areas are in the ultraviolet range.

9. A security system comprising:
a multi-spectral holographic security marker made by the method according to claim 1;
means for illuminating the volume hologram with light of different wavelengths corresponding to the final replay frequencies of the different defined areas of the security marker; and
a multi-spectral camera or data capture device able to identify and fuse together the different wavelength displays to recreate the complete security information.

10. A security system according to claim 9, wherein a surface hologram is impressed over that part or those parts of a surface of the film data carrier lying directly over a part or parts of the recorded image plane volume hologram having a final replay frequency in the invisible part of the spectrum.

11. A security system according to claim 9, wherein security information is encrypted in the volume hologram recording, and a fusion of the information present in the different wavelength displays, together with information present in a holographic phase mask in the camera or data capture device, is needed to enable the security information to be passed to a decryption program or device.

12. A security system according to claim 11, wherein a fusion of the information present in the different wavelength displays, together with the information present in the holographic phase mask in the camera or data capture device, causes generation of a visually recognizable word, phrase, or sign indicating to a user that the security marker has been identified as genuine.

13. A security system according to claim 11, wherein a fusion of the information present in the different wavelength displays, together with information contained in the surface hologram, and together with information present in the holographic phase mask in the camera or data capture device, is needed to enable the security information to be passed to the decryption program or device.

14. A security system according to claim 13 wherein a fusion of the information present in the different wavelength displays, together with information contained in the surface hologram, and together with the information present in the holographic phase mask in the camera or data capture device, causes generation of a visually recognizable word, phrase, or sign indicating to a user that the security marker has been identified as genuine.

15. A method according to claim 1, wherein the surface hologram is directly above and in precise alignment with at least one area of the recorded volume hologram which has a replay frequency in the IR portion of the spectrum.

16. A method of making a multi-spectral holographic security marker comprising an image plane volume hologram recorded at one or more first replay frequencies in a light-sensitive film data carrier; wherein the film data carrier comprises a polymeric material that is pressure-sensitive so that on compression the final replay frequency or frequencies of the recorded volume hologram is or are shifted away from the respective first replay frequency or frequencies, characterized in that the image plane volume hologram recorded in the film data carrier comprises graphical data or a linear code or a matrix code containing security data, and different areas of the film data carrier have been compressed to the same or different extents after recordal of the volume hologram therein, with the result that a plurality of different areas of the film data carrier have a plurality of different final replay frequencies for the hologram recorded therein, with the different areas having uniquely defined boundaries which together form a security identification code or pattern which provides further security data, the method comprising:

recording, in the film data carrier, an image plane volume hologram having the one or more first replay frequencies, being a hologram of graphic data or a linear code or a matrix code containing security data;

preparing a die one or more portions of which have a given thickness and one or more other portions of which have at least one thickness greater then the given thickness, the boundaries of the different thickness portions of the die together forming a security code or pattern; and pressing the die into the surface of the film data carrier or into a surface covering thereon, the pressure being sufficient to move the final replay frequencies of the portions of the volume hologram recorded directly beneath those portions of the die having the greater thickness or thicknesses to one or more final replay frequencies each different from the corresponding first replay frequency;

thereby creating in the film data carrier an image plane volume hologram of the linear code or matrix code security data, of which at least one area has the first replay frequency or one of the first replay frequencies, and at least one other area has a final replay frequency differing from the first, with the different areas having boundaries which together form the said security identification code or pattern which provides further security data, wherein the die is a holographic master die, with one or more portions of a surface thereof carrying the negative of a surface diffraction grating embodying a surface hologram, so that when the master die is pressed into the surface of the film data carrier or into a surface coating thereon, the pressure is sufficient to create, on the surface or surface coating, a surface hologram which is directly above and in precise alignment with an area or areas of the recorded volume hologram which has the first replay frequency or frequencies.

17. A method according to claim 16, wherein the surface hologram is directly above and in precise alignment with at least one area of the recorded volume hologram which has a replay frequency in the IR portion of the spectrum.

18. A method of making a multi-spectral holographic security marker comprising an image plane volume hologram recorded at one or more first replay frequencies in a light-sensitive film data carrier; wherein the film data carrier comprises a polymeric material that is pressure-sensitive so that on compression the final replay frequency or frequencies of the recorded volume hologram is or are shifted away from the respective first replay frequency or frequencies, characterized in that the image plane volume hologram recorded in the film data carrier comprises graphical data or a linear code or a matrix code containing security data, and different areas of the film data carrier have been compressed to the same or different extents after recordal of the volume hologram therein, with the result that a plurality of different areas of the film data carrier have a plurality of different final replay frequencies for the hologram recorded therein, with the different areas having uniquely defined boundaries which together form a security identification code or pattern which provides further security data, the method comprising:

recording, in the film data carrier, an image plane volume hologram having the one or more first replay frequencies, being a hologram of graphic data or a linear code or a matrix code containing security data;

preparing a die one or more portions of which have a given thickness and one or more other portions of which have at least one thickness greater then the given thickness, the boundaries of the different thickness portions of the die together forming a security code or pattern; and pressing the die into the surface of the film data carrier or into a surface covering thereon, the pressure being sufficient to move the final replay frequencies of the portions of the volume hologram recorded directly beneath those portions of the die having the greater thickness or thicknesses to one or more final replay frequencies each different from the corresponding first replay frequency;

thereby creating in the film data carrier an image plane volume hologram of the linear code or matrix code security data, of which at least one area has the first replay frequency or one of the first replay frequencies, and at least one other area has a final replay frequency differing from the first, with the different areas having boundaries which together form the said security identification code or pattern which provides further security data, wherein the die is a holographic master die, with one or more portions of a surface thereof carrying the negative of a surface diffraction grating embodying a surface hologram, so that when the master die is pressed into the surface of the film data carrier or into a surface coating thereon, the pressure is sufficient to create, on the surface or surface coating, a surface hologram which is directly above and in precise alignment with an area or areas of the recorded volume hologram which has or which have at least one final replay frequency differing from the corresponding first replay frequency.

\* \* \* \* \*